United States Patent
De Jonghe et al.

(10) Patent No.: US 8,758,914 B2
(45) Date of Patent: Jun. 24, 2014

(54) LI-ION/POLYSULFIDE FLOW BATTERY

(75) Inventors: Lutgard C. De Jonghe, Lafayette, CA (US); Steven J. Visco, Berkeley, CA (US); Yevgeniy S. Nimon, Danville, CA (US); Bruce D. Katz, Orinda, CA (US)

(73) Assignee: PolyPlus Battery Company, Berkeley, CA (US)

( * ) Notice: Subject to any disclaimer, the term of this patent is extended or adjusted under 35 U.S.C. 154(b) by 218 days.

(21) Appl. No.: 13/161,351

(22) Filed: Jun. 15, 2011

(65) Prior Publication Data
US 2013/0059177 A1    Mar. 7, 2013

Related U.S. Application Data

(60) Provisional application No. 61/356,433, filed on Jun. 18, 2010.

(51) Int. Cl.
- *H01M 8/18* (2006.01)
- *H01M 2/40* (2006.01)
- *H01M 4/58* (2010.01)
- *H01M 8/20* (2006.01)
- *H01M 4/38* (2006.01)

(52) U.S. Cl.
CPC ............ *H01M 4/5815* (2013.01); *H01M 4/382* (2013.01); *H01M 8/188* (2013.01); *Y02E 60/528* (2013.01); *Y02E 60/12* (2013.01); *H01M 8/20* (2013.01)
USPC ................................ 429/51; 429/70; 429/347

(58) Field of Classification Search
None
See application file for complete search history.

(56) References Cited

U.S. PATENT DOCUMENTS

| | | | |
|---|---|---|---|
| 5,413,881 A | 5/1995 | Licht | |
| 5,571,600 A | 11/1996 | Licht | |
| 5,595,837 A | 1/1997 | Olsen et al. | |
| 5,686,201 A | 11/1997 | Chu | |
| 6,030,720 A | 2/2000 | Chu et al. | |
| 6,103,426 A | 8/2000 | Narang et al. | |
| 6,344,293 B1 | 2/2002 | Geronov | |
| 6,358,643 B1 * | 3/2002 | Katz et al. | 429/105 |
| 6,376,123 B1 | 4/2002 | Chu | |
| 6,436,583 B1 | 8/2002 | Mikhaylik | |
| 6,878,487 B2 | 4/2005 | Cho et al. | |
| 6,911,280 B1 | 6/2005 | De Jonghe et al. | |
| 2002/0192557 A1 | 12/2002 | Choi et al. | |

(Continued)

FOREIGN PATENT DOCUMENTS

| | | |
|---|---|---|
| EP | 1176658 | 1/2002 |
| EP | 1178555 | 2/2002 |
| EP | 1291941 | 3/2003 |
| WO | 2006/059085 | 6/2006 |
| WO | 2006/088861 | 8/2006 |

OTHER PUBLICATIONS

U.S. Appl. No. 11/354,223, Office Action mailed Sep. 1, 2009.

(Continued)

*Primary Examiner* — Patrick Ryan
*Assistant Examiner* — Christopher Domone
(74) *Attorney, Agent, or Firm* — Weaver Austin Villeneuve & Sampson LLP

(57) ABSTRACT

Li-Ion/Polysulfide flow battery systems are provided to achieve high energy density and long service life. The system is configured to minimize corrosion of the lithium electrode by providing an electrochemical reactor comprising a first and a second electrode configured in spaced apart relation defining an inter-electrode channel through which the sulfur electrolyte is caused to flow.

25 Claims, 1 Drawing Sheet

(56) References Cited

U.S. PATENT DOCUMENTS

| | | |
|---|---|---|
| 2003/0124434 A1 | 7/2003 | Gan et al. |
| 2005/0158614 A1* | 7/2005 | Hennessy ............... 429/61 |
| 2005/0158615 A1* | 7/2005 | Samuel et al. ............ 429/81 |
| 2005/0175894 A1 | 8/2005 | Visco et al. |
| 2006/0194115 A1 | 8/2006 | De Jonghe et al. |
| 2006/0208701 A1 | 9/2006 | Mikhaylik |
| 2007/0117007 A1 | 5/2007 | Visco et al. |
| 2007/0172739 A1 | 7/2007 | Visco et al. |
| 2011/0179636 A1 | 7/2011 | De Jonghe et al. |
| 2013/0122334 A1 | 5/2013 | Visco et al. |
| 2013/0122344 A1 | 5/2013 | Visco et al. |
| 2013/0141050 A1 | 6/2013 | Visco et al. |

OTHER PUBLICATIONS

U.S. Appl. No. 11/354,223, Office Action mailed Jun. 3, 2010.
U.S. Appl. No. 11/354,223, Office Action mailed Nov. 5, 2010.
U.S. Appl. No. 13/080,170, Office Action mailed May 23, 2011.
U.S. Appl. No. 13/080,170, Office Action mailed Oct. 13, 2011.
U.S. Appl. No. 13/080,170, Office Action mailed Mar. 1, 2012.
WO patent application No. PCT/US2006/005163, International Search Report and Written Opinion mailed Nov. 15, 2007.
U.S. Appl. No. 13/599,317, "Intercalation anode protection for cells with dissolved lithium polysulfides," De Jonghe et al., filed Aug. 30, 2012.
WO patent application No. PCT/US2012/065251, International Search Report and Written Opinion mailed Nov. 15, 2012.
Wrodnigg et al., "Ethylene Sulfite as Electrolyte Additive for Lithium-Ion Cells with Graphitic Anodes," Journal of the Electrochemical Society, 146 (2) 470-472 (1999).
Ota et al., "TPD-GC/MS analysis of the solid electrolyte interface (SEI) on a graphite anode in the propylene carbonate/ethylene sulfite electrolyte system for lithium batteries," Journal of Power Sources, 97-98 (2001) 107-113.
Ota et al., "XAFS and TOF-SIMS analysis of SEI layers on electrodes," Journal of Power Sources, 119-121 (2003) 567-571.

* cited by examiner

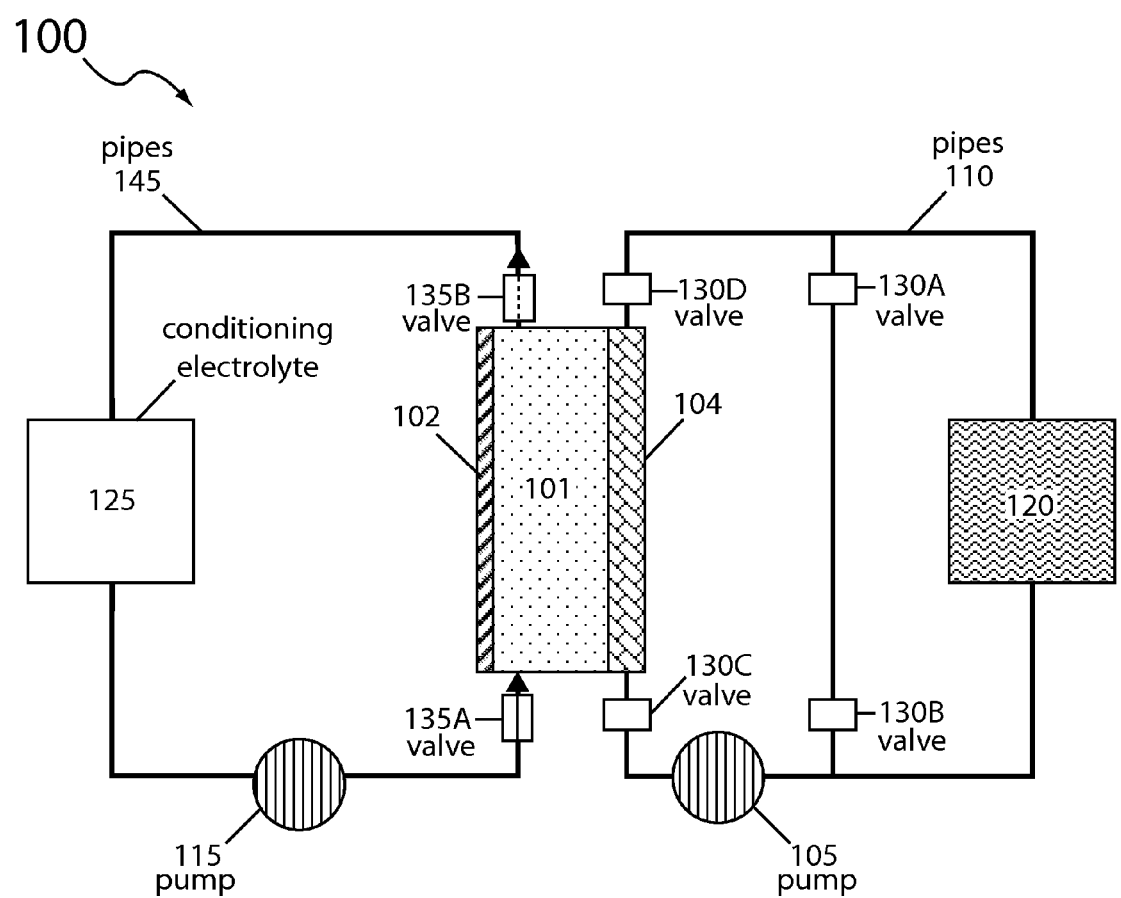

LI-ION/POLYSULFIDE FLOW BATTERY

CROSS-REFERENCE TO RELATED APPLICATIONS

This application claims priority to U.S. Provisional Patent Application No. 61/356,433 filed Jun. 18, 2010, titled Li-Ion/Polysulfide Flow Battery, which is incorporated herein by reference in its entirety and for all purposes.

BACKGROUND OF THE INVENTION

1. Field of the Invention

The present invention relates generally to electrochemical energy storage devices and systems. In particular, the invention relates to a flow battery system.

2. Description of Related Art

To enable the widespread use of renewable electric energy (e.g., solar and wind) there is a critical need for a cost effective grid scale energy storage solution that is independent of the geological and ecological landscape. Today, pumped hydro and sub-surface compressed air, while economically viable, are generally recognized as unsuitable for widespread deployment, and existing battery technologies are either too expensive or unreliable.

The Li/S battery has been the subject of considerable work to date, typically aimed at creating high energy density batteries chiefly for mobile/portable applications. Generally composed of a lithium metal anode, a sulfur cathode, and a polysulfide electrolyte, the Li/S battery is regarded for its high specific energy and low raw materials cost, but is also considered unexceptional in its ability to cycle. Corrosion of lithium metal in direct contact with the polysulfide electrolyte is one of the major factors leading to its poor cycling efficiency, and in certain applications this also brings about an unacceptably high self-discharge rate.

Today there exists a critical need for a cost effective grid scale battery storage solution, where the key technology driver is battery service life, and ultimately cost. Sulfur is inexpensive, but previously known sulfur-based batteries (e.g., Li/S) are unsuitable or otherwise have not yet achieved performance inline with the needs of the utility grid.

SUMMARY OF THE INVENTION

The present invention provides a flow battery system comprising one or more electrochemical reactors composed of a pair of spatially separated electrodes (a first and a second electrode) defining an inter-electrode channel through which an electroactive electrolyte is caused to flow. A distinctive feature of the instant flow battery system is that the electrochemistry taking place in the reactor is asymmetric in that the type of electric charge moving between the chemical phases at each electrode/electrolyte interface is different, namely metal ions across the first electrode/electrolyte interface and electrons across the other interface (second electrode/electrolyte). According to various embodiments, corrosion of the lithium electrode can be minimized and service life of the battery optimized.

In accordance with one aspect of the invention, the first electrode comprises a solid electroactive component material that is a physical component of the electrode itself, and is sometimes referred to herein as "non-flowing" or "static" in that, during normal operation, it does not move or flow through the channel. The electrochemistry at the first electrode involves the transfer of an active metal ion between the solid phase electroactive material and the electrolyte, typically liquid phase. Specifically, when the solid electroactive material is electro-reduced or electro-oxidized it respectively absorbs or desorbs a particular type of active metal ion from or into the electrolyte in order to maintain an overall state of charge neutrality. In contrast, the electric charge transferred across the electrode/electrolyte interface at the second electrode are electrons, and the second electrode comprises an electron transfer material having an active surface on which electroactive species, circulating through the channel via the electrolyte, and preferably dissolved therein, are electrochemically reduced/oxidized.

Another distinctive feature of the present invention is that the instant flow battery system utilizes but one electrolyte composition circulating through the channel at any given time (e.g., a lithium polysulfide solution as described below). Therefore, to enable the respective electric charge transfer as described above, sufficient contact exists between the flowing electrolyte and each of the first and second electrode. Typically, the electrolyte is caused to circulate through the channel using a flow device such as a pump, e.g., a peristaltic pump. Moreover, with but one electrolyte flowing through the channel, it is another feature of the instant battery system that it does not require, and therefore the reactor may be devoid of, an ion selective membrane (e.g., cationic or anionic selective membrane) disposed within the channel interposing the electrodes.

In various embodiments, the majority of the electroactive species, which, as described above, are a component of the electrolyte, are contained in an external reservoir system fluidly coupled to the reactor. For instance, the reservoir system may include a storage tank, for holding electrolyte, flow connected, e.g., via pipe-works, to an inlet port of the reactor and once therein directed to flow through the channel. In certain embodiments, the electrolyte not only circulates through the channel but is caused to circulate through the reservoir as well.

The system, as described above, may be operated in various modes: i) an active discharge mode when delivering electrical power to an external load; ii) an active charge mode when receiving electrical power from an external source; and iii) an idle mode (or idling mode) when the system is neither delivering nor receiving electrical power. Sometimes, the system is referred to as operating in active mode, which means that it is either in one or the other of discharge or charge mode, actively delivering or receiving electrical power.

In various embodiments the external reservoir system, and in particular the pipe-works, includes valves for controlling the circulation path of the electrolyte. Accordingly, the system may be operated in various states differentiated by the particular circulation path of the electrolyte. For instance, a closed state, where, with the valves between the channel and storage tank closed, the circulating electrolyte is directed to flow within the reactor, through the channel, but not the tank, or, alternatively, in an open state, where, the valves open, the tank is made part of the circulation path. It is also contemplated herein that self-discharge of the reactants may be mitigated by pumping or otherwise driving the electrolyte out of the channel when the system is in idling mode, leaving the channel substantially devoid of electrolyte, and then pumping it back into the channel prior to switching over to active mode.

The battery system, readily scalable and cost effective, is particularly suitable as an energy storage solution for the electrical utility grid.

In various embodiments one or both the solid electroactive component material and the electroactive species are sensitive to water and incompatible in contact with a water-based medium including ambient air and in particular aqueous electrolytes, and therefore the flowing electrolyte is non-aqueous, and the reactor enclosure is sufficient to protect against the ingress of any moisture from the air.

In accord with the general description above, the energy storage system of the present invention is exemplified by a Li-ion/Sulfur flow battery system wherein the flowing electrolyte is a moisture sensitive non-aqueous polysulfide solution comprising electroactive polysulfide species, preferably dissolved therein, and the first electrode has a solid electroactive component which, typically in the form of a layer, comprises a lithium intercalation material, e.g., lithiated carbon, such as graphitic or graphitic like carbon.

In contrast to that of conventional self-contained Li/S batteries, the instant flow battery system is open for receiving fresh polysulfide solutions injected from the external reservoir system for circulation through the channel, and thus the energy capacity is not solely determined by that amount of electrolyte present between and in the pores of the anode and cathode. By this expedient two advantages are achieved: i) cumulative self-discharge is limited because the vast majority of the polysulfides are held in the external reservoir, removed from, and when the valves are closed, isolated from contact with the electrodes; and ii) very high energy capacity can be achieved, and, in particular, even at low concentrations of sulfur in the electrolyte, since the overall system capacity is determined not by the open volume in or between the electrodes, but by the amount of electrolyte in the reservoir (tank). The ability to achieve high-energy capacity using a low concentration sulfur electrolyte is a prominent advantage of the instant system, especially for certain applications, such as renewable grid storage, where exceptional service life is the key driving factor, and high rates of discharge and charge may be demanded. With decreasing sulfur concentration there is a concomitant lowering of the electrolyte viscosity, which is advantageous not only for electrolyte flow but electrode kinetics as well. Moreover, using a dilute polysulfide solution (e.g., less than 3 molar sulfur) enhances dissolution rates, which facilitates keeping the electroactive polysulfide species in solution (i.e., dissolved in a solvent(s) of the electrolyte) and mitigates battery self-discharge by decreasing the rate at which the polysulfide solution corrodes the first electrode. Accordingly, in certain embodiments, the system is operated to maintain the electroactive species in a dissolved state, facilitated by microprocessor control, including electronics for counting coulombs of charge passed, and an algorithm for projecting the overall oxidation state of the electroactive species. For instance, when projected that the oxidation state of the species in the circulating electrolyte is approaching a predetermined value, e.g., whereupon precipitation is imminent, polysulfides of higher oxidation state may be let into the reactor via electrolyte from the reservoir, where, in mixing with the more reduced species in the channel will react in solution phase contact to raise the overall oxidation state of the electroactive species.

To improve overall system performance, and in particular service life via lessening or preventing self discharge or side reactions involving polysulfide redox at the first electrode, the solid electroactive component material (e.g., the carbon intercalation material) may have a surface composition that is different than its bulk. For instance, where the bulk composition is conductive of electrons and lithium ions, the surface composition, though also conductive of lithium ions, may be an electronic insulator or otherwise depress kinetics of electron transfer enough that sulfur redox cannot compete with the intercalation/de-intercalation reaction, and, therefore, is effectively mitigated if not entirely eliminated at the first electrode.

The above mentioned surface composition may be formed or otherwise modified via a first electrode conditioning operation, also sometimes referred to herein as a preoperational conditioning in that it is typically undertaken prior to active operation, and even more typically prior to any initial active operation. Conditioning of the first electrode may involve the use of what is termed herein a conditioning solution or electrolyte which is caused to flow into and/or to circulate through the channel where it reacts in contact with the first electrode, and in particular with the solid electroactive component material. The conditioning solution, typically absent the electroactive species, may be stored in a second external reservoir, or second tank, wherefrom it is fed into the reactor and therein may be caused to circulate, e.g., via pumping action, through the channel.

Conditioning of the first electrode may be facilitated or enhanced by electrochemical action. For instance, a third electrode may be inserted in the reactor, typically disposed between the first and second electrode, and electrically coupled to the first electrode, or, alternatively, a sacrificial electroactive material may be integrated with the second electrode, and electrochemical action undertaken through the application of an external voltage applied between the first and second electrode (or that between the first and third electrode, if used). By use of the term sacrificial when referring to electroactive materials it is generally meant a solid material, typically a metal, that is electrochemically striped when electro-reduced. For example, where the solid electroactive component material of the first electrode is carbon (or other intercalation material), the sacrificial material may be lithium metal, and the electrochemical action, in striping the lithium, lithiates the carbon, and may also, in the process, modify the surface composition of the carbon as described above for the purpose of eliminating or mitigating corrosion between the lithiated carbon and the electrolyte.

These and other features of the invention are further described and exemplified in the detailed description below.

BRIEF DESCRIPTION OF THE DRAWINGS

FIG. 1 schematically illustrates one embodiment of a flow battery system in accordance with the present invention.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the scope of the appended claims. In the following description, numerous specific details are set forth in order to provide a thorough understanding of the present invention. The present invention may be practiced without some or all of these specific details. In other instances, well known process operations have not been described in detail so as to not unnecessarily obscure the present invention.

In accordance with the invention, the first electrode includes a solid electroactive component material that is a physical component of the electrode itself, and is sometimes referred to herein as a "non-flowing" solid electro-active material or it (the solid electroactive material) may be referred to as being non-flowing. In operation, the electrochemistry at the first electrode involves reduction or oxidation of the solid electroactive material along with, in keeping with the requirement of charge neutrality, a concomitant absorption or desorption of a particular type of active metal ion from or into the electrolyte as it flows through the channel.

In a particular inventive embodiment the invention provides a sulfur based flow battery system, wherein the electrolyte flowing through the channel is a non-aqueous polysulfide solution comprising dissolved sulfur electroactive species, the first electrode is an intercalation electrode comprising a non-flowing solid electroactive component material (e.g., a carbon intercalation material) and the second electrode provides an active surface on which electroactive species, flowing through the channel via the electrolyte medium, are electrochemically reduced/oxidized during system operation. In certain embodiments the system further comprises an external electrolyte reservoir fluidly coupled to the reactor, such as a polysulfide electrolyte filled tank, and the electrolyte is circulated through the channel, as well as the tank, during active system operation (i.e., during operating modes of charge and discharge).

With reference to FIG. 1 there is illustrated a representative embodiment of a flow battery system 100 in accordance with the instant invention. The system includes a reactor cell in which there is included a first electrode 102 and a second electrode 104 configured in a spatially apart relation, defining an inter-electrode channel 101 through which a fluid electrolyte is caused to flow. Typically the first electrode and second electrode are positioned in the reactor such that a major face of each is disposed in a substantially parallel face-to-face relationship.

The first electrode 102 includes a solid electroactive component material that is a physical component of the electrode itself, and is sometimes referred to herein as a "non-flowing" solid electro-active material or it (the solid electroactive material) may be referred to as being non-flowing. In operation, the electrochemistry at the first electrode involves reduction or oxidation of the solid electroactive material along with, in keeping with the requirement of charge neutrality, a concomitant absorption or desorption of a particular type of active metal ion from or into the electrolyte as it flows through the channel.

In contrast to the electrochemistry occurring at the first electrode, where the electroactive material is a component of the electrode itself, and non-flowing, the second electrode has an electron transfer component material, also non-flowing, but with a surface on which electroactive species that do flow via the electrolyte, and, typically dissolved therein, are either reduced or oxidized, and, preferably, after being electrochemically reacted, the product species of the electrochemistry remain dissolved in or are dissolved by the electrolyte.

The solid electroactive component of the first electrode may be in the form of a layer comprising a solid electroactive component material that in active operation, or during system idling, is non-flowing. The component layer may be adhered to or integrated with a substrate component material for current collection and/or mechanical support. The physical make-up of the layer may be homogenous in that it solely consists of the solid electroactive material, or it may include other components for improving one or more of the adhesion, cohesion and electronic conduction. The layer may be porous to enhance through-flow and thereby facilitate interaction between the solid electroactive material and the electrolyte. The thickness of the layer, and therefore the first electrode itself, is determined by several factors including the loading volume of actives, pore structure and overall open volume of the layer and the desired capacity of the electrode itself.

In various embodiments the solid electroactive component material may be an intercalation material which when electro-reduced intercalates a particular type of active metal ion from the electrolyte and when electro-oxidized de-intercalates that type of active metal ion. Alternatively, the solid electroactive component material may be an alloy material or compound capable of alloying and de-alloying with the active metal ion or a material that undergoes a displacement reaction involving the active metal ion. It is also contemplated that the electroactive material may be a metal of the active metal ion where during reduction of the material the metal is plated and during oxidation ions of the metal are stripped.

Where the first electrode utilizes a solid electroactive component material that is a physical component of the electrode itself, as opposed to it being a component of the electrolyte, the second electrode utilizes species in the electrolyte, i.e., a component of the electrolyte, as the electroactive which partakes in the electrochemistry at it, the second electrode. Accordingly, the second electrode has an electron transfer material which is a material having a surface on which species present in the electrolyte electrochemically react concomitant with the electrochemistry taking place at the first electrode. Suitable electron transfer component materials include metals but in particular carbon materials, e.g., carbon blacks and acetylene black.

In this sense, the flow system uses both a solid, non-flowing, electroactive component material incorporated as a component in one of the reactor's electrode and a flowing electroactive species present in the electrolyte for the electroactive at the second electrode.

Continuing with reference to FIG. 1 the system further comprises an external reservoir system including an external reservoir 120, which may take the form a storage tank for storing the electrolyte to be flowed through the channel. The reservoir system may also include pipeworks for fluidly coupling the tank 120 to the reactor, and a pump 105 for circulating the electrolyte through the channel. The pipe-works include pipes or tubes 110 e.g., polyethylene tubes and may be configured with valves 130 A, B, C, D for closing or opening the reactor to the storage tank. When closed the pump may be operated for circulating the electrolyte through the channel. When opened, electrolyte from the tank may be pumped into the reactor at selective periods.

The system may also include an electronics module, not shown, for counting coulombs of charge delivered to and by the system, for the purpose of ascertaining the oxidation state of the polysulfide species. The electronics module may include a microprocessor embedded with an algorithm for projecting the oxidation state. For instance, when projected that the oxidation state of the species in the circulating electrolyte is approaching a predetermined value, e.g., whereupon precipitation is eminent, polysulfides of higher oxidation state may be let into the reactor via electrolyte from the reservoir, where, in mixing with the more reduced species in the channel will react in solution phase contact to raise the overall oxidation state of the electroactive species.

In various embodiments the invention provides a Li ion/Sulfur flow battery wherein the first electrode comprises a solid electroactive component material that is an intercalation material, e.g., lithiated carbon and the electrolyte is a non-aqueous polysulfide solution where dissolved polysulfide species are electrochemically reduced/oxidized at the second electrode during system operation.

The sulfur electrolyte non-aqueous includes at least one non-aqueous solvent (e.g., a glyme) capable of dissolving polysulfide species, and typically also a lithium salt for supporting the electrical current through the electrolyte. Suitable non-aqueous sulfur electrolyte compositions are described in applicant's patents, including U.S. Pat. Nos. 6,358,643 and 6,030,720 which are both hereby incorporated by reference in their entireties.

To improve overall system performance, and in particular service life via lessening or preventing self discharge or side reactions involving polysulfide redox at the first electrode, the solid electroactive component material (e.g., the carbon intercalation material) may have a surface composition that is different than its bulk. For instance, where the bulk composition is conductive of electrons and lithium ions, the surface composition, though also conductive of lithium ions, may be an electronic insulator or otherwise depress kinetics of electron transfer enough that sulfur redox cannot compete with the intercalation/de-intercalation reaction, and, therefore, is effectively mitigated if not entirely eliminated at the first electrode.

Accordingly, as shown in FIG. 1, the system 100 may be optionally configured with additional pipe-works (pipes 145, valves 135A, B, and pump 115) and a second storage tank 125 (i.e., second reservoir) containing a conditioning electrolyte to form a surface composition on one or both electrodes prior to or intermittently between active battery operation. Typically, the conditioning electrolyte is circulated for treating the lithium anode (i.e., first electrode) prior to operation.

The above mentioned surface composition may be formed or otherwise modified via a first electrode conditioning operation, also sometimes referred to herein as a preoperational conditioning in that it is typically undertaken prior to active operation, and even more typically prior to any initial active operation. Conditioning of the first electrode 102 may involve the use of what is termed herein a conditioning solution or electrolyte which is caused to flow into and/or to circulate through the channel where it reacts in contact with the first electrode, and in particular with the solid electroactive component material. The conditioning solution, typically absent the electroactive species, may be stored in a second external reservoir 125, or second tank, wherefrom it is fed into the reactor, via pipe-works (pipes 145, valves 135A, B, and pump 115) and caused to circulate, e.g., via pumping action, through the channel.

Conditioning of the first electrode may be facilitated or enhanced by electrochemical action. For instance, a third electrode, not shown, may be inserted in the reactor, typically disposed between the first and second electrode, and electrically coupled to the first electrode, or, alternatively, a sacrificial electroactive material may be integrated with the second electrode, and electrochemical action undertaken through the application of an external voltage applied between the first and second electrode (or that between the first and third electrode, if used). By use of the term sacrificial when referring to electroactive materials it is generally meant a solid material, typically a metal, that is electrochemically striped when electro-reduced. For example, where the solid electroactive component material of the first electrode is carbon (or other intercalation material), the sacrificial material may be lithium metal, and the electrochemical action, in striping the lithium, lithiates the carbon, and may also, in the process, modify the surface composition of the carbon as described above for the purpose of eliminating or mitigating corrosion between the lithiated carbon and the electrolyte.

In various embodiments, prior to active operation the system may be preconditioned, and typically with electrochemical action. In one embodiment the system includes a third electrode, not shown, comprising lithium metal and inserted between the first and second electrode and which is electrically coupled to the first electrode. For treating the first electrode a preconditioning electrolyte is pumped into the reactor, and may be caused to circulate there through, while an external voltage is applied between the first and third electrode to lithiate the carbon of the first electrode and thereby also modify, or otherwise form, the carbon surface in order to mitigate self-discharge. For instance, the conditioning electrolyte may comprise sulfite additives. Electrolytes and solutions suitable for treating carbon surfaces in Li-carbon/sulfur batteries having a sulfur positive electrode are fully described in applicant's co-pending US patent application US Patent Pub. No. 2006/0194115, and the compositions of those electrolytes and solutions and treatment methods are incorporated by reference herein.

In contrast to that of conventional self-contained Li/S batteries, the instant flow battery system is open for receiving fresh polysulfide solutions injected from the external reservoir system for circulation through the channel, and thus the energy capacity is not solely determined by that amount of electrolyte present between and in the pores of the anode and cathode. By this expedient two advantages are achieved: i) cumulative self-discharge is limited because the vast majority of the polysulfides are held in the external reservoir, removed from, and when the valves are closed, isolated from contact with the electrodes; and ii) very high energy capacity can be achieved, and, in particular, even at low concentrations of sulfur in the electrolyte, since the overall system capacity is not determined not by the open volume in or between the electrodes, but by the amount of electrolyte in the reservoir (tank). The ability to achieve high-energy capacity using a low concentration sulfur electrolyte is a prominent advantage of the instant system, especially for certain applications, such as renewable grid storage, where exceptional service life is the key driving factor, and high rates of discharge and charge may be demanded. With decreasing sulfur concentration there is a concomitant lowering of the electrolyte viscosity, which is advantageous not only for electrolyte flow but electrode kinetics as well. Moreover, using a dilute polysulfide solution (e.g., less than 3 molar sulfur) enhances dissolution rates, which facilitates keeping the electroactive polysulfide species in solution (i.e., dissolved in a solvent(s) of the electrolyte) and mitigates battery self-discharge by decreasing the rate at which the polysulfide solution corrodes the first electrode. Accordingly, in certain embodiments, the system is operated to maintain the electroactive species in a dissolved state, facilitated by microprocessor control, including electronics for counting coulombs of charge passed, and an algorithm for projecting the overall oxidation state of the electroactive species. For instance, when projected that the oxidation state of the species in the circulating electrolyte is approaching a predetermined value, e.g., whereupon precipitation is eminent, polysulfides of higher oxidation state may be let into the reactor via electrolyte from the reservoir, where, in mixing with the more reduced species in the channel will react in solution phase contact to raise the overall oxidation state of the electroactive species.

What is claimed is:

1. A sulfur flow battery electrochemical reactor system comprising:
   a first static electrode comprising a non-flowing solid lithium electroactive component;
   a sulfur electrolyte comprising dissolved electroactive sulfur species in a liquid phase;
   and a second flow electrode comprising a solid electron transfer material having a surface in direct contact with the sulfur electrolyte and the electroactive species dissolved therein;

wherein the first and second electrodes are configured in spaced apart relation defining a single inter-electrode flow channel for the sulfur electrolyte, and the system is without an ion selective membrane disposed within the channel interposing the electrodes.

2. The sulfur flow battery system of claim 1 wherein the material of the electroactive component of the first electrode is for desorbing active metal ions into the sulfur electrolyte during battery system discharge, and for absorbing active metal ions from the sulfur electrolyte during battery system charge.

3. The sulfur flow battery system of claim 2 wherein the solid electroactive component is in the form of a layer adhered to a current collector substrate.

4. The sulfur flow battery system of claim 3 wherein the solid electroactive component layer is porous.

5. The sulfur flow battery system of claim 4 wherein the system is a Li-ion/Sulfur flow battery system, wherein the flowing electrolyte is a non-aqueous polysulfide solution comprising electroactive polysulfide species dissolved therein.

6. The sulfur flow battery system of claim 4 wherein the thickness of the solid electroactive component layer is at least 0.5 mm.

7. The sulfur flow battery system of claim 2 wherein the metal of said active metal ion is an alkali metal and the solid electroactive component material is selected from the group consisting of an intercalation material of said active alkali metal, an alloy material of said active alkali metal, the metal of said active alkali metal, and a displacement reaction material of said active alkali metal.

8. The sulfur flow battery system of claim 2 wherein the active metal ion is lithium.

9. The sulfur flow battery system of claim 2 wherein the active metal ion is lithium and the electroactive component material is a lithium carbon intercalation material.

10. The sulfur flow battery system of claim 2 wherein the solid electroactive component material has a bulk composition conductive of electrons and lithium ions and a surface composition that in contact with the sulfur electrolyte is chemically compatible in such contact, electronically insulating and conductive of lithium ions.

11. The sulfur flow battery system of claim 2 wherein the second electrode comprises an electron transfer material having a surface in contact with the sulfur electrolyte whereon electrons are transferred from the second electrode to dissolved electroactive sulfur species during battery system discharge and electrons are transferred from dissolved electroactive sulfur species to the second electrode during battery system charge.

12. The sulfur flow battery system of claim 10 wherein the electron transfer material is selected from the group consisting of metals, semi-metals, carbons, and electronically conducting polymers.

13. The sulfur flow battery system of claim 11 wherein the electron transfer material is a carbon material.

14. The sulfur flow battery system of claim 11, wherein the solid electroactive component material of the first electrode and the electron transfer material of the second electrode are carbon materials.

15. The sulfur flow battery system of claim 14 wherein the solid carbon electroactive component material of the first electrode has a bulk composition conductive of electrons and lithium ions and a surface composition that in contact with the sulfur electrolyte is chemically compatible in such contact, electronically insulating and conductive of lithium ions, and the carbon electron transfer material of the second electrode is selected from the group consisting of a carbon material having a bulk composition that is not conductive of lithium ions and a surface composition that is conductive of electrons and a carbon material having a surface composition that conducts electrons but does not conduct lithium ions.

16. The sulfur flow battery system of claim 14 wherein the solid electroactive carbon material has a different carbon atomic structure than that of the electron transfer carbon material.

17. The sulfur flow battery system of claim 14 wherein the solid electroactive carbon material comprises sheets having a planar graphitic structure and the electron transfer carbon material has an amorphous atomic structure.

18. The sulfur flow battery system of claim 1 further comprises an electrolyte storage tank fluidly coupled to the reactor, the tank comprising sulfur electrolyte comprising electroactive sulfur species.

19. The sulfur flow battery system of claim 18 wherein the volumetric ratio of sulfur electrolyte present in the inter-electrode channel at any given time during system operation to the volume of sulfur electrolyte in the storage tank is less than 1:10.

20. The sulfur flow battery system of claim 1 wherein the reactor is enclosed in a housing having a first inlet port through which sulfur electrolyte flows into the reactor and a first outlet port through which sulfur electrolyte flows out of the reactor.

21. The sulfur flow battery system of claim 1 further comprising an electrolyte flow device for causing electrolyte to flow through the inter-electrode channel.

22. The sulfur flow battery system of claim 1 wherein the sulfur electrolyte present in the inter-electrode channel contacts the solid electroactive component material and the electron transfer medium, and therein also provides a contiguous medium for ionic conduction between the first and second electrode.

23. The flow battery system of claim 1 wherein the composition of the sulfur electrolyte in the inter-electrode region nearby the first and second electrode is substantially the same.

24. The sulfur flow battery system of claim 1 wherein the inter-electrode channel further comprises a porous material layer disposed between the first and second electrode, the porosity of the layer sufficient to allow the desired flow rate of electrolyte along the channel length and to accommodate sufficient electrolyte in its pores to support the ionic conduction between the first and second electrode.

25. The sulfur flow battery system of claim 24 wherein the porous material layer contacts the first and second electrode.

* * * * *